(12) United States Patent
Wu (10) Patent No.: US 12,284,550 B2
(45) Date of Patent: Apr. 22, 2025

(54) PROCESSING METHOD AND COMMUNICATIONS DEVICE (71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 708 days.

(21) Appl. No.: 17/388,629

(22) Filed: Jul. 29, 2021

(65) Prior Publication Data

US 2021/0360473 A1  Nov. 18, 2021

Related U.S. Application Data (63) Continuation of application No. PCT/CN2020/073778, filed on Jan. 22, 2020.

(30) Foreign Application Priority Data

Jan. 30, 2019 (CN) .......................... 201910093599.0

(51) Int. Cl.
| H04W 28/06 | (2009.01) |
| H04L 69/04 | (2022.01) |
| H04W 80/02 | (2009.01) |

(52) U.S. Cl.
CPC ............. *H04W 28/06* (2013.01); *H04L 69/04* (2013.01); *H04W 80/02* (2013.01)

(58) Field of Classification Search
CPC ..... H04W 76/27; H04W 72/23; H04W 80/02; H04W 76/15; H04W 24/10; H04W 28/06;
(Continued)

(56) References Cited

U.S. PATENT DOCUMENTS

2009/0080374 A1  3/2009  Lee
2012/0214686 A1  8/2012  Scaboo
(Continued)

FOREIGN PATENT DOCUMENTS

CN  103581033 A  2/2014
CN  107801212 A  3/2018
(Continued)

OTHER PUBLICATIONS

R2-1707077, RoHC Issue on NR PDCP discussion and decision notes, 3GPP TSG-RAN WG2 NR Ad Hoc, Qingdao, China, Jun. 27-29, 2017.
(Continued)

*Primary Examiner* — Khalid W Shaheed
(74) *Attorney, Agent, or Firm* — von Briesen & Roper, s.c.

(57) ABSTRACT

Embodiments of this disclosure provide a processing method and a communications device, and the method includes: determining a compression or decompression ROHC entity based on first information; where the first information is one or more of the following: indication information in a header of a PDCP packet; information of mobility procedure completion; a PDCP identifier of a PDCP packet; a connection corresponding to a PDCP packet; indication information in a PDCP control packet; PDCP configuration information; and configuration information for compression or decompression ROHC entities.

18 Claims, 2 Drawing Sheets

(58) Field of Classification Search
CPC ..... H04W 76/19; H04W 76/11; H04W 72/21; H04W 74/0833; H04L 5/0053; H04L 5/0048; H04L 5/0092; H04L 5/005; H04L 69/04

See application file for complete search history.

(56) References Cited

U.S. PATENT DOCUMENTS

| | | | |
|---|---|---|---|
| 2017/0201603 | A1 | 7/2017 | Uchino et al. |
| 2019/0090156 | A1* | 3/2019 | Kim .................. H04L 67/12 |
| 2020/0084664 | A1 | 3/2020 | Wu |

FOREIGN PATENT DOCUMENTS

| | | |
|---|---|---|
| CN | 108632901 A | 10/2018 |
| CN | 108810984 A | 11/2018 |
| EP | 3217716 B1 | 1/2019 |
| JP | 2014511178 A | 5/2014 |
| JP | 2016092700 A | 5/2016 |
| WO | 0233931 A1 | 4/2002 |
| WO | WO-2018171328 A1 * | 9/2018 ............. H04L 69/04 |
| WO | WO-2018202047 A1 * | 11/2018 ............. H04L 47/34 |

OTHER PUBLICATIONS

R2-1807588, Unified UE behavior for ROHC continue, Discussion and Decision notes, 3GPP TSG-RAN WG2 Meeting #102, Busan, Korea, May 21-25, 2018.

Written Opinion and International Preliminary Report on Patentability dated Jul. 27, 2021, in related application pct/cn202/073778 filed Jan. 22, 20202.

Extended European search report related to Application No. 20749437.8 reported on Feb. 23, 2022.

First Japanese Office Action related to Application No. 2021-544648 reported on Aug. 30, 2022.

Japanese Office Action Related to Application No. 2023-078109; reported on Jun. 24, 2024.

European Office Action related to Application No. 20749437.8 reported on Nov. 28, 2025.

* cited by examiner

PROCESSING METHOD AND COMMUNICATIONS DEVICE

CROSS-REFERENCE TO RELATED APPLICATIONS

This application is a continuation application of PCT Application No. PCT/CN2020/073778 filed on Jan. 22, 2020, which claims priority to Chinese Patent Application No. 201910093599.0, filed in China on Jan. 30, 2019, the disclosures of which are incorporated herein by reference in their entireties.

TECHNICAL FIELD

Embodiments of this disclosure relate to the field of communications technologies, and specifically, to a processing method and a communications device.

BACKGROUND

When there are a plurality of compression (or decompression) robust header compression (ROHC) entities on a network side to work for one data radio bearer (DRB) (or packet data convergence protocol (PDCP) of a terminal, how to implement header compression or decompression on a terminal side and the network side is a problem to be urgently resolved.

SUMMARY

According to a first aspect in the embodiments of this disclosure, a processing method is provided, applied to a communications device, where the method includes:
determining a compression or decompression robust header compression ROHC entity based on first information; where
the first information is one or more of the following: indication information in a header of a packet data convergence protocol PDCP packet; information of mobility procedure completion; a PDCP identifier of a PDCP packet; a connection corresponding to a PDCP packet; indication information in a PDCP control packet; PDCP configuration information; and configuration information for compression or decompression ROHC entities.

According to a second aspect in the embodiments of this disclosure, a communications device is further provided, including:
a determining module, configured to: determine a compression or decompression ROHC entity based on first information; where
the first information is one or more of the following: indication information in a header of a PDCP packet; information of mobility procedure completion; a PDCP identifier of a PDCP packet; a connection corresponding to a PDCP packet; indication information in a PDCP control packet; PDCP configuration information; and configuration information for compression or decompression ROHC entities.

According to a third aspect in the embodiments of this disclosure, a communications device is further provided, including: a processor, a memory, and a program stored in the memory and capable of running on the processor. When the program is executed by the processor, the steps of the processing method described above are implemented.

According to a fourth aspect in the embodiments of this disclosure, a non-transitory computer-readable storage medium is further provided. A computer program is stored in the non-transitory computer-readable storage medium, and when the computer program is executed by a processor, the steps of the processing method described above are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more optional or advantageous than other embodiments or design solutions. To be precise, the words such as "an example" or "for example" are intended to present a related concept in a specific manner.

For better understanding the technical solutions in the embodiments of this disclosure, the following describes two technical points.

1. Introduction to Robust Header Compression (ROHC)

In a long term evolution (LTE) or 5th generation mobile communication (5G) new radio (NR) system, a network side may configure a ROHC function in a packet data convergence protocol (PDCP) entity. The ROHC function corresponds to a maximum of one ROHC compression (which is, for example, corresponding to uplink data transmission on the terminal side) entity (or module, or protocol layer, or context) and a maximum of one ROHC decompression (which is, for example, corresponding to downlink data transmission on the terminal side) entity in the PDCP entity (or module, or protocol layer, or context). The ROHC entity may compress and decompress a header of a higher-layer data packet (for example, Transmission Control Protocol (TCP)/Internet Protocol (IP)), and the ROHC decompression entity may transmit feedback information about a decompression status to a peer ROHC compression entity.

During a switching process, the network side may configure (that is, using DRB ROHC continuity (drb-ContinueROHC) signaling to indicate) whether the ROHC entity of the PDCP entity needs to be reset.

For example, if the network side wants the terminal during switching to still use a ROHC entity that is used before switching, the network side configures drb-ContinueROHC for the terminal, and the terminal does not reset its ROHC, but continues to use the ROHC entity that is used before the switching.

2. Introduction to Dual Connectivity (DC) Switching

In the 5G system, to meet an interruption delay of 0 ms in a mobility procedure, the terminal needs to have a connection for data transmission and reception on both a source node and a target node in the mobility procedure. To maintain the data connection on both the source node and the target node, the source node and the target node on the corresponding network side have an independent ROHC compression or decompression entity.

Techniques described in this specification are not limited to a 5G system and a later evolved communications system, and also are not limited to an LTE or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (wireless fidelity, (Wi-Fi)), IEEE 802.16 (world interoperability for microwave access (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies.

Figure 1:
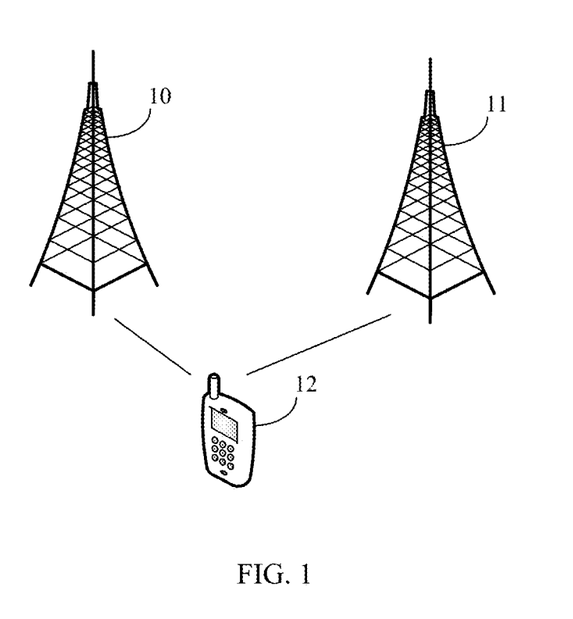
FIG. 1 is a schematic architectural diagram of a wireless communications system according to an embodiment of this disclosure.

The following describes the embodiments of this disclosure with reference to the accompanying drawings. A processing method and a device provided in the embodiments of this disclosure may be applied to a wireless communications system. Referring to FIG. 1, FIG. 1 is a schematic architectural diagram of a wireless communications system according to an embodiment of this disclosure. As shown in FIG. 1, the wireless communications system may include: a first network device 10, a second network device 11, and a terminal. The terminal is denoted as user equipment (UE) 12, and the UE 12 may communicate (transmit signaling or transmit data) with the first network device 10 and the second network device 11. In an actual application, a connection between the foregoing devices may be a wireless connection. To conveniently and intuitively represent a connection relationship between the devices, a solid line is used in FIG. 1. It should be noted that the foregoing communications system may include a plurality of UEs 12, and the first network device 10 and the second network device 11 may communicate with the plurality of UEs 12.

The terminal provided in the embodiments of this disclosure may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

The first network device 10 and the second network device 11 provided in this embodiment of this disclosure may be base stations. The base station may be a commonly used base station, or may be an evolved node base station (eNB), or may be a device in a 5G system such as a network-side device (for example, a next generation base station (gNB)) or a transmission and reception point (TRP).

In the embodiments of this disclosure, the ROHC entity may also be referred to as a ROHC module, a ROHC protocol layer, or a ROHC context.

Figure 2:
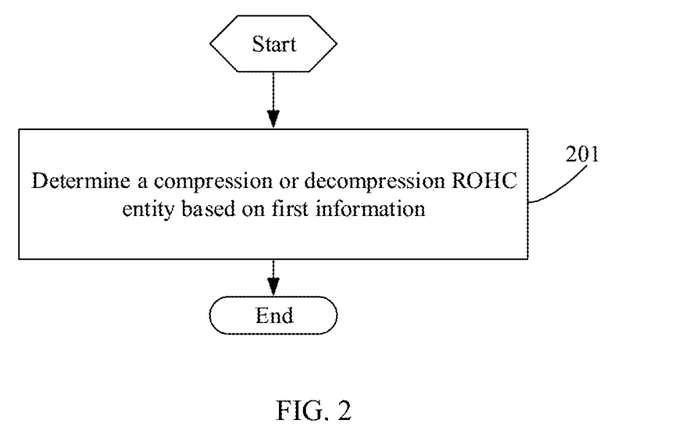
FIG. 2 is a flowchart of a processing method according to an embodiment of this disclosure.

Referring to FIG. 2, an embodiment of this disclosure further provides a processing method. The method may be executed by a communications device, such as a terminal or a network device. The method includes step 201.

Step 201: Determine a compression or decompression ROHC entity based on first information.

The first information may be one or more of the following: indication information in a header of a PDCP packet; information of mobility procedure completion; a PDCP identifier of a PDCP packet; a connection corresponding to a PDCP packet; indication information in a PDCP control packet; PDCP configuration information; and configuration information for compression or decompression ROHC entities.

It should be noted that the PDCP packet may be a PDCP data packet and/or a ROHC feedback packet.

If the communications device has a plurality of compression or decompression ROHC entities, for example:

(1.1) The indication information is added to the PDCP header to indicate a used ROHC entity.

(1.2) If a serial number of the PDCP packet is before a specified PDCP serial number (SN), the communications device uses a ROHC entity 1; if the serial number of the PDCP packet is after the specified PDCP SN, the communications device uses a ROHC entity 2.

(1.3) A ROHC entity 1 related to a connection 1 is used for a PDCP packet from the connection 1, and a ROHC entity 2 related to a connection 2 is used for a PDCP packet from the connection 2.

(1.4) The indication information in the PDCP control packet indicates whether to change a ROHC entity used by the communications device.

If the communications device has one ROHC entity, for example:

(2.1) The indication information in the PDCP control packet indicates that the communications device deletes a previous (old) ROHC entity and establishes a new ROHC entity.

(2.2) If a serial number of the PDCP packet is before a specified PDCP SN, the communications device uses a ROHC entity 1, and if the serial number of the PDCP packet is after the specified PDCP SN, the communications device deletes the ROHC entity 1, and establishes and uses a ROHC entity 2.

For example, when the communications device uses a ROHC continuity (ROHC Continue) function, the communications device uses one compression or decompression ROHC entity; otherwise, the communications device uses a plurality of compression or decompression ROHC entities. It can be understood that when the communications device uses one compression or decompression ROHC entity, all the manners described above in (2.1) and (2.2) are applicable. When the communications device uses a plurality of compression or decompression ROHC entities, all the manners described above in (1.1) to (1.4) are applicable.

In this embodiment of this disclosure, optionally, the PDCP configuration information may indicate that the communications device uses the ROHC continuity function, and one PDCP entity of the communications device includes: one compression or decompression ROHC entity.

In this embodiment of this disclosure, optionally, the PDCP configuration information does not indicate that the communications device uses the ROHC continuity function, and one PDCP entity of the communications device includes: a plurality of compression or decompression ROHC entities.

In this embodiment of this disclosure, optionally, the indication information in the PDCP control packet may indicate at least one of the following:

(1) that the communications device changes a compression or decompression ROHC entity;
(2) that the communications device does not change a compression or decompression ROHC entity; or
(3) that the communications device deletes a previous compression or decompression ROHC entity and establishes a new compression or decompression ROHC entity.

In this embodiment of the present invention, optionally, before the step 201, the method shown in FIG. 2 may further include:

determining the corresponding first information based on a specific indication manner.

The specific indication manner may include one or more of the following:

(1) indicating by a header of a PDCP packet;
(2) indicating by configuration information of a PDCP identifier of the PDCP packet;
(3) indicating by configuration information of a connection corresponding to the PDCP packet; and
(4) indicating by a PDCP control packet.

In this embodiment of the present invention, optionally, the specific indication manner may be configured by the network side or prescribed by a protocol.

In this embodiment of this disclosure, optionally, the configuration information of a PDCP identifier may include one or more of the following:

(1) a specified PDCP packet identifier;
(2) a compression or decompression ROHC entity used for a PDCP packet whose identifier is before the specified PDCP packet identifier; or
(3) a compression or decompression ROHC entity used for a PDCP packet whose identifier is after the specified PDCP packet identifier.

In this embodiment of this disclosure, optionally, if the PDCP entity of the communications device includes: a plurality of compression or decompression ROHC entities, step 201 may include any one of the following:

(1) if the PDCP identifier of the PDCP packet is before a specified PDCP identifier, using a corresponding compression or decompression ROHC entity; and
(2) if the PDCP identifier of the PDCP packet is after the specified PDCP identifier, using a corresponding compression or decompression ROHC entity.

In this embodiment of this disclosure, optionally, if the PDCP entity of the communications device includes: one compression or decompression ROHC entity, step 201 may include any one of the following:

(1) if the PDCP identifier of the PDCP packet is before a specified PDCP identifier, using a first compression or decompression ROHC entity; and
(2) if the PDCP identifier of the PDCP packet is after the specified PDCP identifier, deleting the first compression or decompression ROHC entity, and establishing and using a new compression or decompression ROHC entity.

The first compression or decompression ROHC entity is a specific compression or decompression ROHC entity that is established by the communications device based on configuration information of a plurality of compression or decompression ROHC entities.

In this embodiment of this disclosure, optionally, the configuration information of a connection corresponding to the PDCP packet may include one or more of the following:

(1) a correspondence between specified connections and specified compression ROHC entities; and
(2) a correspondence between specified connections and specified decompression ROHC entities.

In this embodiment of this disclosure, optionally, step 201 may include any one of the following:

if the connection corresponding to the PDCP packet is a first connection, using a compression or decompression ROHC entity corresponding to the first connection.

In this embodiment of this disclosure, optionally, step 201 may include one or more of the following:

(1) establishing a plurality of compression or decompression ROHC entities based on configuration information of a plurality of compression or decompression ROHC entities; and
(2) establishing one specific compression or decompression ROHC entities based on configuration information of one compression or decompression ROHC entity.

In this embodiment of this disclosure, optionally, step 201 may include:

after a mobility procedure is completed, determining, based on the information of mobility procedure completion, a compression or decompression ROHC entity corresponding to a target connection.

In this embodiment of the present invention, optionally, after step 201, the method shown in FIG. 2 may further include one or more of the following:

(1) resetting a compression or decompression ROHC entity corresponding to a source connection; and (2) deleting the compression or decompression ROHC entity corresponding to the source connection.

In this embodiment of this disclosure, optionally, a trigger event for the mobility procedure completion includes one or more of the following:

(1) a terminal receives indication information of mobility procedure completion transmitted by a network side;
(2) the terminal transmits indication information of mobility procedure completion to the network side;
(3) a random access procedure on the target connection is completed; and
(4) the terminal receives indication information of data processing completion for a source connection.

In this embodiment of the present invention, optionally, after step 201, the method shown in FIG. 2 may further include any one of the following:

(1) determining, based on the PDCP identifier of the PDCP packet, a connection for transmitting the PDCP packet; and
(2) determining, based on a compression ROHC entity that compresses the PDCP packet, a connection for transmitting the PDCP packet.

In this embodiment of the present invention, optionally, after step 201, the method shown in FIG. 2 may further include any one of the following:

(1) during transmission of ROHC entity change information, compressing or decompressing the header of the PDCP packet by using a changed-to compression or decompression ROHC entity;
(2) before transmission of ROHC entity change information, compressing or decompressing the header of the PDCP packet by using the changed-to compression or decompression ROHC entity; and
(3) after transmission of ROHC entity change information, compressing or decompressing the header of the PDCP packet by using the changed-to compression or decompression ROHC entity.

In this embodiment of the present invention, optionally, after step 201, the method shown in FIG. 2 further includes any one of the following:

(1) during changing of a compression or decompression ROHC entity in use, if the PDCP configuration information indicates that the communications device uses the ROHC continuity function, skipping resetting a previously used compression or decompression ROHC entity;
(2) before changing of the compression or decompression ROHC entity in use, if the PDCP configuration information indicates that the communications device uses the ROHC continuity function, skipping resetting the previously used compression or decompression ROHC entity; and
(3) after changing of the compression or decompression ROHC entity in use, if the PDCP configuration information indicates that the communications device uses the ROHC continuity function, skipping resetting the previously used compression or decompression ROHC entity.

In this embodiment of the present invention, optionally, after step 201, the method shown in FIG. 2 further includes any one of the following:

(1) during changing of a compression or decompression ROHC entity in use, if the PDCP configuration information does not indicate that the communications device uses the ROHC continuity function, resetting a previously used compression or decompression ROHC entity;
(2) before changing of the compression or decompression ROHC entity in use, if the PDCP configuration information does not indicate that the communications device uses the ROHC continuity function, resetting the previously used compression or decompression ROHC entity; and
(3) after changing of the compression or decompression ROHC entity in use, if the PDCP configuration information does not indicate that the communications device uses the ROHC continuity function, resetting the previously used compression or decompression ROHC entity.

In this embodiment of the present invention, optionally, after step 201, the method shown in FIG. 2 may further include any one of the following:

(1) during changing of a compression or decompression ROHC entity in use, resetting a previously used compression or decompression ROHC entity;
(2) before changing of the compression or decompression ROHC entity in use, resetting the previously used compression or decompression ROHC entity; and
(3) after changing of the compression or decompression ROHC entity in use, resetting the previously used compression or decompression ROHC entity.

In this embodiment of the present invention, optionally, after step 201, the method shown in FIG. 2 may further include any one of the following:

(1) during changing of a compression or decompression ROHC entity in use, deleting a previously used compression or decompression ROHC entity;
(2) before changing of the compression or decompression ROHC entity in use, deleting the previously used compression or decompression ROHC entity; and
(3) after changing of the compression or decompression ROHC entity in use, deleting the previously used compression or decompression ROHC entity.

In this embodiment of this disclosure, when there are a plurality of compression or decompression ROHC entities on the network side to work for a DRB (or PDCP) of the communications device, the communications device can still implement the header compression or decompression function.

For a better understanding of the embodiments of this disclosure, a PDCP transmit end in the following embodiments may correspond to a PDCP transmit end of UE and that of the network side respectively, and a PDCP receive end corresponds to a PDCP receive end of the UE and that of the network side respectively.

Embodiment 1.1: A header of a PDCP packet indicates a plurality of compression or decompression ROHC entities.

Step 1: A network side configures or a protocol prescribes that UE manages a plurality of compression or decompression ROHC entities in a header indication (for example, indication information in a PDCP packet header) manner.

Step 2: When the UE receives configuration information of a plurality of compression or decompression ROHC entities of one PDCP entity, the UE establishes a plurality of compression ROHC entities for uplink transmission, and the UE establishes a plurality of decompression ROHC entities for downlink reception.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE establishes a plurality of compression ROHC entities for uplink transmission, and the UE establishes a plurality of decompression ROHC entities for downlink reception.

Step 3.1: According to step 2, behavior of a PDCP receive end includes:

after receiving a PDCP packet (for example, a PDCP data packet and/or a ROHC feedback packet), the PDCP receive end uses, based on ROHC entity indication information in a PDCP protocol data unit (PDU) header of the PDCP packet, a specific compression or decompression ROHC entity for processing.

For example, when the receiving PDCP entity of the UE receives a PDCP data packet, a PDCP PDU header of the PDCP data packet indicates using a decompression ROHC1 for the PDCP data packet. Then, the receiving PDCP entity of the UE uses the decompression ROHC1 to decompress the PDCP PDU header.

For another example, when the receiving PDCP entity of the UE receives a ROHC feedback packet, a PDCP PDU header of the ROHC feedback packet indicates using a decompression ROHC1 for the PDCP PDU header. Then, the receiving PDCP entity of the UE uses the decompression ROHC1 to process the PDCP PDU header.

Step 3.2: According to step 1, behavior of a PDCP transmit end includes:

when the PDCP transmit end uses a specific compression or decompression ROHC entity for compressing (or transmitting a ROHC feedback packet (for example, "Control PDU for interspersed ROHC feedback")), the PDCP transmit end indicates the used compression or decompression ROHC entity in a header of the transmitted PDCP packet.

For example, when the transmitting PDCP entity of the UE transmits data, if a PDCP header of the data is compressed by using a compression ROHC1, the PDCP PDU header of the data indicates the used compression ROHC1.

For another example, when the transmitting PDCP entity of the UE transmits a ROHC feedback packet (for example, "Control PDU for interspersed ROHC feedback"), if a compression ROHC1 is used for the ROHC feedback packet, a PDCP PDU header of the ROHC feedback packet indicates the used compression ROHC1.

Additionally, a data packet to be transmitted over each connection by the PDCP transmit end uses a compression or decompression ROHC entity corresponding to the connection.

For example, based on configuration information (which is, for example, using a compression or decompression ROHC1 for the source connection and using a compression or decompression ROHC2 for the target connection) on the network side, the PDCP transmit end of the UE uses the compression or decompression ROHC1 for the data to be transmitted over the source connection, and uses the compression or decompression ROHC2 for the data to be transmitted over the target connection.

Additionally, step 4: For a mobility procedure (for example, switching or secondary cell group change (SCG change)), after the UE completes the mobility procedure, the transmitting PDCP entity of the UE uses a compression or decompression ROHC entity corresponding to the target connection (that is, no longer uses a compression or decompression ROHC entity corresponding to the source connection).

Further, the transmitting PDCP entity of the UE resets and/or deletes the compression or decompression ROHC entity corresponding to the source connection.

A trigger event for the mobility procedure completion includes any combination of one or more of the following:
(1) indication information of mobility procedure completion transmitted by the network side is received, for example, the network side transmits a configuration message for deleting the source connection;
(2) indication information of mobility procedure completion is transmitted to the network side, for example, the UE transmits an indication message for deleting the source connection to the network side;
(3) a random access procedure on the target connection is completed; and
(4) data of the source connection received by the transmitting PDCP entity has been all processed, for example, has been decompressed, or has been decrypted, or has been transmitted to the higher layer.

Embodiment 1.2: A PDCP identifier indicates a plurality of compression or decompression ROHC entities.

Step 1: A network side configures or a protocol prescribes that UE manages the plurality of compression or decompression ROHC entities in a PDCP identifier (for example, a PDCP SN or count) indication manner.

Configuration information of the PDCP identifier includes any one of the following:
(1) a downlink PDCP packet identifier;
(2) an uplink PDCP packet identifier;
(3) a compression or decompression ROHC entity used before (or after) the downlink or uplink PDCP packet identifier.

For example, the network side configures using a compression or decompression ROHC1 before a specified PDCP SN (for example, 100), and using a compression or decompression ROHC2 after the specified PDCP SN.

Step 2: When the UE receives configuration information of a plurality of compression or decompression ROHC entities of one PDCP entity, the UE establishes a plurality of compression ROHC entities for uplink transmission, and the UE establishes a plurality of decompression ROHC entities for downlink reception.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE establishes a plurality of compression ROHC entities for uplink transmission, and the UE establishes a plurality of decompression ROHC entities for downlink reception.

Step 3.1: According to step 2, behavior of a PDCP receive end includes:

after the PDCP receive end receives a PDCP packet (for example, a PDCP data packet and/or a ROHC feedback packet), the UE uses, based on an identifier of the received PDCP packet, a specific compression or decompression ROHC entity for processing.

For example, when the receiving PDCP entity of the UE receives data, a PDCP PDU header indicates that a PDCP SN of a PDCP data packet is a number before a configured PDCP SN. Then, the receiving PDCP entity of the UE decompresses the PDCP PDU header by using the compression or decompression ROHC1; otherwise, the compression or decompression ROHC2 is used.

For another example, when the receiving PDCP entity of the UE receives a ROHC feedback packet, a PDCP SN of a PDCP packet received (or transmitted) before the ROHC feedback packet is a number before the configured PDCP SN number. Then, the receiving PDCP entity of the UE uses the compression or decompression ROHC1 to process the PDCP PDU header; otherwise, the compression or decompression ROHC2 is used.

Step 3.2: According to step 1, behavior of a PDCP transmit end includes:

when the PDCP transmit end transmits a PDCP packet (for example, a PDCP data packet and/or a ROHC feedback packet), the UE uses, based on an identifier of the transmitted PDCP packet, a specific compression or decompression ROHC entity for processing.

For example, when the transmitting PDCP entity of the UE transmits data, a PDCP SN of the PDCP data packet is a number before a configured PDCP SN. Then, the transmitting PDCP entity of the UE compresses a PDCP PDU header by using the compression or decompression ROHC1; otherwise, the compression or decompression ROHC2 is used.

Additionally, for a data packet to be transmitted over each connection, the PDCP transmit end determines, based on a PDCP identifier, a connection for transmitting the data packet. For example, in a DC switching process, when the transmitting PDCP entity of the UE transmits data, a PDCP SN of the data packet is a number before the configured PDCP SN. Then, the UE transmits the data packet through a source connection; otherwise, transmits the data packet through the target connection.

Additionally, step 4: For a mobility procedure (for example, switching or SCG change), after the UE completes the mobility procedure, the PDCP entity of the UE uses a compression or decompression ROHC entity corresponding to the target connection, that is, no longer uses a compression or decompression ROHC entity corresponding to the source connection.

Additionally, the PDCP entity of the UE resets and/or deletes the compression or decompression ROHC entity corresponding to the source connection.

A trigger event for the mobility procedure completion includes any combination of one or more of the following:

(1) indication information of mobility procedure completion transmitted by the network side is received, for example, the network side transmits a configuration message for deleting the source connection;

(2) indication information of mobility procedure completion is transmitted to the network side, for example, the UE transmits an indication message for deleting the source connection to the network side;

(3) a random access procedure on the target connection is completed; and (4) data received over the source connection by the PDCP has been all processed, for example, has been decompressed, or has been decrypted, or has been transmitted to the higher layer.

Embodiment 1.3: A compression or decompression ROHC entity is selected from a plurality of compression or decompression ROHC entities based on a connection corresponding to the PDCP packet.

Step 1: A network side configures or a protocol prescribes that UE manages the plurality of compression or decompression ROHC entities by using a connection corresponding to the PDCP packet.

Configuration information of the connection corresponding to the PDCP packet includes: a specific compression or decompression ROHC entity corresponding to a specific connection.

For example, the network side configures using a decompression ROHC1 for a data packet received over a connection 1, and the network side configures using a compression ROHC1 for a data packet transmitted over the connection 1.

Step 2: When the UE receives configuration information of a plurality of compression or decompression ROHC entities of one PDCP entity, the UE establishes a plurality of compression ROHC entities for uplink transmission, and the UE establishes a plurality of decompression ROHC entities for downlink reception.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE establishes a plurality of compression ROHC entities for uplink transmission, and the UE establishes a plurality of decompression ROHC entities for downlink reception.

Step 3.1: According to step 2, behavior of a PDCP receive end includes:

after the PDCP receive end receives a PDCP packet (for example, a PDCP data packet and/or a ROHC feedback packet), the UE uses, based on a connection for the received PDCP packet, a specific compression or decompression ROHC entity for processing.

For example, when the receiving PDCP entity of the UE receives a PDCP data packet, the PDCP data packet is received over the connection 1. Then, the receiving PDCP entity of the UE uses the decompression ROHC1 to decompress a PDCP PDU header of the PDCP data packet.

For another example, when the receiving PDCP entity of the UE receives the ROHC feedback packet, the ROHC feedback packet is received over the connection 1. Then, the receiving PDCP entity of the UE uses the decompression ROHC1 to process the PDCP PDU Step 3.2: According to step 1, behavior of a PDCP transmit end includes:

when the PDCP transmit end transmits a PDCP packet (for example, a PDCP data packet and/or a ROHC feedback packet), the UE uses, based on a connection for the transmitted PDCP packet, a specific compression or decompression ROHC entity for processing.

For example, during transmission of a PDCP data packet, the transmitting PDCP entity of the UE transmits the PDCP data packet over the connection 1. Then, the PDCP transmit entity of the UE uses the compression ROHC1 to compress a PDCP PDU of the PDCP data packet.

For another example, when the transmitting PDCP entity of the UE transmits a ROHC feedback packet, the ROHC feedback packet is a ROHC feedback packet to a received data packet corresponding to ROHC1. Then, the transmitting PDCP entity of the UE uses the compression ROHC1 to process the ROHC PDCP PDU header. In addition, the ROHC feedback packet is transmitted over the connection corresponding to the compression ROHC1.

Additionally, for a PDCP packet to be transmitted over each connection, the PDCP transmit end determines, based on a used compression or decompression ROHC entity, a connection over which the PDCP packet is to be transmitted.

For example, in a DC switching process, when the transmitting PDCP entity of the UE transmits a PDCP packet, the PDCP packet uses the compression ROHC1. Then, the PDCP packet is transmitted through a connection corresponding to the compression ROHC1.

Additionally, step 4: For a mobility procedure (for example, switching or SCG change), after the UE completes the mobility procedure, the PDCP entity of the UE uses a compression or decompression ROHC entity corresponding to the target connection, that is, no longer uses a compression or decompression ROHC entity corresponding to the source connection.

Additionally, the PDCP entity of the UE resets and/or deletes the compression or decompression ROHC entity corresponding to the source connection.

A trigger event for the mobility procedure completion includes any combination of one or more of the following:
(1) indication information of mobility procedure completion transmitted by the network side is received, for example, the network side transmits a configuration message for deleting the source connection;
(2) indication information of mobility procedure completion is transmitted to the network side, for example, the UE transmits an indication message for deleting the source connection to the network side;
(3) a random access procedure on the target connection is completed; and
(4) data received over the source connection by the PDCP has been all processed, for example, has been decompressed, or has been decrypted, or has been transmitted to the higher layer.

Embodiment 1.4: Change of a plurality of compression or decompression ROHC entities is implemented by using a PDCP control packet.

Step 1: A network side configures or a protocol prescribes that UE manages the plurality of compression or decompression ROHC entities by using a PDCP control packet.

For example, after the PDCP control packet is received, a compression or decompression ROHC entity to be subsequently used is determined based on indication information of the PDCP control packet.

Step 2: When the UE receives configuration information of a plurality of compression or decompression ROHC entities of one PDCP entity, the UE establishes a plurality of compression ROHC entities for uplink transmission, and the UE establishes a plurality of decompression ROHC entities for downlink reception.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE establishes a plurality of compression ROHC entities for uplink transmission, and the UE establishes a plurality of decompression ROHC entities for downlink reception.

Step 3: After receiving ROHC entity change information (for example, a PDCP control packet) transmitted by the network side, the UE uses a changed-to compression or decompression ROHC entity.

For example, one PDCP entity of the UE receives a PDCP control packet, and the PDCP control packet indicates a compression or decompression ROHC entity to be used by the PDCP. Then, the PDCP entity changes the compression or decompression ROHC entity in use.

Alternatively, when (or before, or after) transmitting ROHC entity change information to the network side, the UE uses a changed-to compression or decompression ROHC entity.

For example, when (or before, or after) one PDCP entity of the UE transmits a PDCP control packet, the PDCP control packet indicates a compression or decompression ROHC entity to be used by the PDCP. Then, the PDCP entity changes the compression or decompression ROHC entity in use.

Additionally, during (or before, or after) changing of the compression or decompression ROHC entity in use, the PDCP entity of the UE resets the compression or decompression ROHC entity.

Additionally, during (or before, or after) changing of the compression or decompression ROHC entity in use, the PDCP entity of the UE deletes a previously used compression or decompression ROHC entity.

Embodiment 2.1: Change of one compression or decompression ROHC entity is implemented by using a PDCP control packet.

Step 1: A network side configures or a protocol prescribes that UE manages one compression or decompression ROHC entity by using a PDCP control packet.

For example, after the PDCP control packet is received, a compression or decompression ROHC entity to be subsequently used is determined based on indication information of the PDCP control packet.

Step 2: When receiving configuration information of a plurality of compression or decompression ROHC entities of one PDCP entity, the UE first uses one specific compression or decompression ROHC entity.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE first uses the compression ROHC1 for uplink transmission, and the UE first uses the decompression ROHC1 for downlink reception.

Step 3: After receiving ROHC entity change information (for example, a PDCP control packet) transmitted by the network side, the UE uses (or establishes) a changed-to compression or decompression ROHC entity.

For example, one PDCP entity of the UE receives a PDCP control packet, and the PDCP control packet indicates a compression or decompression ROHC entity to be used by the PDCP. Then, the PDCP entity changes the compression or decompression ROHC entity in use.

Alternatively, when (or before, or after) transmitting compression or decompression ROHC entity change information to the network side, the UE uses (establishes) a changed-to compression or decompression ROHC entity.

For example, when (or before, or after) one PDCP entity of the UE transmits a PDCP control packet, the PDCP control packet indicates a compression or decompression ROHC entity to be used by the PDCP. Then, the PDCP entity changes the compression or decompression ROHC entity in use.

Additionally, during (or before, or after) changing of the compression or decompression ROHC entity in use, the PDCP entity of the UE resets the ROHC entity in use.

Additionally, during (or before, or after) changing of the compression or decompression ROHC entity in use, the PDCP entity of the UE deletes a previously used ROHC entity.

In addition, during (or before, or after) changing of the compression or decompression ROHC entity in use by the PDCP entity of the UE, if a ROHC continuity function (for example, drb-ContinueROHC) is configured on the network side, the PDCP entity of the UE does not reset the compression or decompression ROHC entity.

In addition, during (or before, or after) changing of the ROHC entity in use by the PDCP entity of the UE, if a compression or decompression ROHC continuity function (for example, drb-ContinueROHC) is not configured on the network side, the PDCP entity of the UE resets the compression or decompression ROHC entity.

Embodiment 2.2: Change of one compression or decompression ROHC entity is implemented by using a PDCP identifier.

Step 1: A network side configures or a protocol prescribes that UE manages one compression or decompression ROHC entity by using a PDCP identifier (for example, a PDCP SN or COUNT).

Configuration information of the PDCP identifier includes any one of the following:
- (1) a downlink PDCP packet identifier;
- (2) an uplink PDCP packet identifier;
- (3) a compression or decompression ROHC entity used before (or after) the PDCP packet identifier.

For example, the network side configures using a compression or decompression ROHC1 before a specified PDCP SN (for example, 100), and using a compression or decompression ROHC2 after the specified PDCP SN.

Step 2: When receiving configuration information of a plurality of compression or decompression ROHC entities of one PDCP entity, the UE first uses one specific compression or decompression ROHC entity.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE first uses the compression ROHC1 for uplink transmission, and the UE first uses the decompression ROHC1 for downlink reception.

Step 3: After receiving corresponding PDCP identifier information transmitted by the network side, the UE uses (or establishes) a changed-to compression or decompression ROHC entity.

For example, one PDCP entity of the UE receives a PDCP identifier that is a number before a configured PDCP SN. Then, the receiving PDCP entity of the UE uses the decompression ROHC1 to process the PDCP PDU; otherwise, the decompression ROHC2 is used.

Alternatively, based on corresponding PDCP identifier information transmitted to the network side, the UE uses (or establishes) a changed-to compression or decompression ROHC entity.

For example, one PDCP entity of the UE transmits a PDCP identifier that is a number before the configured PDCP SN. Then, the receiving PDCP entity of the UE uses the compression ROHC1 to process the PDCP PDU; otherwise, the compression ROHC2 is used.

Additionally, during (or before, or after) changing of the compression or decompression ROHC entity in use, the PDCP entity of the UE resets a previously used compression or decompression ROHC entity.

Additionally, during (or before, or after) changing of the compression or decompression ROHC entity in use, the PDCP entity of the UE deletes a previously used compression or decompression ROHC entity.

In addition, during (or before, or after) changing of the ROHC entity in use by the PDCP entity of the UE, if a ROHC continuity function (for example, drb-ContinueROHC) is configured on the network side, the PDCP entity of the UE does not reset the previously used compression or decompression ROHC entity.

In addition, during (or before, or after) changing of the ROHC entity in use by the PDCP entity of the UE, if a ROHC continuity function (for example, drb-ContinueROHC) is not configured on the network side, the PDCP entity of the UE resets the previously used compression or decompression ROHC entity.

Embodiment 2.3: Change of one compression or decompression ROHC entity is implemented by changing a connection corresponding to the PDCP packet.

Step 1: A network side configures or a protocol prescribes that UE manages one compression or decompression ROHC entity by using a connection corresponding to the PDCP packet.

Configuration information of the connection corresponding to the PDCP packet includes: a specific compression or decompression ROHC entity corresponding to a specific connection.

For example, the network side configures using a decompression ROHC1 for a data packet received over a connection 1, and the network side configures using a compression ROHC1 for a data packet transmitted over the connection 1.

Step 2: When receiving configuration information of a plurality of compression or decompression ROHC entities of one PDCP entity, the UE first uses one specific compression or decompression ROHC entity.

For example, in a DC switching process, for one PDCP entity, a corresponding compression or decompression ROHC entity is separately configured for a source connection and a target connection (for example, a compression or decompression ROHC1 and a compression or decompression ROHC2). In this case, the UE first uses the compression ROHC1 for uplink transmission, and the UE first uses the decompression ROHC1 for downlink reception.

Step 3.1: According to step 2, behavior of a PDCP receive end includes:
- after the PDCP receive end receives a PDCP packet (for example, a PDCP data packet and/or a ROHC feedback packet), the UE uses, based on a connection of a received PDCP packet, a specific decompression ROHC entity for processing.

For example, when the receiving PDCP entity of the UE receives a PDCP data packet, the PDCP data packet is received over the source connection. Then, the receiving PDCP entity of the UE uses the decompression ROHC1 corresponding to the source connection to decompress a PDCP PDU header of the PDCP data packet.

When a connection for receiving the PDCP data packet by the receiving PDCP entity of the UE is changed from the source connection to the target connection, the PDCP entity changes the previously used compression or decompression ROHC entity.

For another example, when the receiving PDCP entity of the UE receives the ROHC feedback packet, the ROHC feedback packet is received over the connection 1. Then, the receiving PDCP entity of the UE uses the decompression ROHC1 corresponding to the connection 1 to perform decompression processing on the PDCP PDU header.

Step 3.2: According to step 1, behavior of a PDCP transmit end includes:
- when the PDCP transmit end transmits a PDCP packet (for example, a PDCP data packet and/or a ROHC feedback packet), the UE uses, based on a connection for the transmitted PDCP packet, a specific compression ROHC entity for processing.

For example, during transmission of a PDCP data packet, the transmitting PDCP entity of the UE transmits the PDCP data packet over the source connection. Then, the PDCP transmit entity of the UE uses the compression ROHC1 corresponding to the source connection to compress a PDCP PDU of the PDCP data packet.

When a connection for transmitting the PDCP data packet by the transmitting PDCP entity of the UE is changed from the source connection to the target connection, the PDCP entity changes the previously used compression or decompression ROHC entity.

For another example, when the transmitting PDCP entity of the UE transmits a ROHC feedback packet, the ROHC feedback packet is a ROHC feedback packet to a received data packet corresponding to the compression ROHC1. Then, the transmitting PDCP entity of the UE uses the compression ROHC1 to process the PDCP PDU header. In addition, the ROHC feedback packet is transmitted over the connection corresponding to the compression ROHC1.

Additionally, during (or before, or after) changing of the compression or decompression ROHC entity in use, the PDCP entity of the UE resets a previously used compression or decompression ROHC entity.

Additionally, during (or before, or after) changing of the compression or decompression ROHC entity in use, the PDCP entity of the UE deletes a previously used compression or decompression ROHC entity.

Additionally, during (or before, or after) changing of the ROHC entity in use, the PDCP entity of the UE resets the previously used compression or decompression ROHC entity.

In addition, during (or before, or after) changing of the compression or decompression ROHC entity in use by the PDCP entity of the UE, if a ROHC continuity function (for example, drb-ContinueROHC) is configured on the network side, the PDCP entity of the UE does not reset the previously used compression or decompression ROHC entity.

In addition, during (or before, or after) changing of the compression or decompression ROHC entity in use by the PDCP entity of the UE, if a ROHC continuity function (for example, drb-ContinueROHC) is not configured on the network side, the PDCP entity of the UE resets the previously used compression or decompression ROHC entity.

Additionally, for a PDCP packet to be transmitted over each connection, the PDCP transmit end determines, based on a used compression ROHC entity, a connection over which the PDCP packet is to be transmitted.

For example, in a DC switching process, when the transmitting PDCP entity of the UE transmits a PDCP packet, the PDCP packet uses the compression ROHC1. Then, the PDCP packet is transmitted through a connection corresponding to the compression ROHC1.

Additionally, step 4: For a mobility procedure (for example, handover or SCG change), after the UE completes the mobility procedure, the PDCP entity of the UE uses a compression or decompression ROHC entity corresponding to the target connection (that is, no longer uses a compression or decompression ROHC entity corresponding to the source connection).

Additionally, the PDCP entity of the UE resets and/or deletes the compression or decompression ROHC entity corresponding to the source connection.

A trigger event for the mobility procedure completion includes any combination of one or more of the following:

(1) indication information of mobility procedure completion transmitted by the network side is received, for example, the network side transmits a configuration message for deleting the source connection;
(2) indication information of mobility procedure completion is transmitted to the network side, for example, the UE transmits an indication message for deleting the source connection to the network side;
(3) a random access procedure on the target connection is completed; and
(4) data received over the source connection by the PDCP has been all processed, for example, has been decompressed, or has been decrypted, or has been transmitted to the higher layer.

Embodiment 3: A ROHC continuity function is configured on the network side, to control whether to use one or a plurality of compression or decompression ROHC entities.

Step 1: The network side configures the ROHC continuity function (for example, drb-ContinueROHC) to control whether to establish one compression or decompression ROHC or a plurality of compression or decompression ROHC entities for one PDCP entity of the UE.

Step 2: According to configuration information in step 1, behavior of UE includes any one of the following:

(1) If the PDCP configuration information indicates using the ROHC continuity function (that is, indication of not resetting the ROHC), the PDCP entity uses one compression or decompression ROHC entity at a time, without using the function of changing the compression or decompression ROHC entity in Embodiment 2.1 or 2.2.

(2) If the PDCP configuration information does not indicate to use the ROHC continuity function, and the UE receives configuration information for a plurality of compression or decompression ROHC entities of one PDCP entity, the UE establishes a plurality of compression ROHC entities for uplink transmission, and the UE establishes a plurality of decompression ROHC entities for downlink reception.

(3) If the PDCP configuration information does not indicate using the ROHC continuity function (that is, indication of not resetting the ROHC), the PDCP entity uses one compression or decompression ROHC entity at a time, without using the function of changing the compression or decompression ROHC entity in Embodiment 2.1 or 2.2.

When the UE uses (or establishes) a plurality of compression or decompression ROHC entities at a time, behaviour of the UE is the same as that in examples 1.1, 1.2, 1.3, and 1.4, and details are is not described herein again.

When the UE uses (or establishes) one compression or decompression ROHC entity at a time, if the function of changing the compression or decompression ROHC entity in Example 2.1 or 2.2 is used, behaviour of the UE is the same as that the function of changing the compression or decompression ROHC entity in Example 2.1 or 2.2, and details are is not described herein again.

An embodiment of this disclosure further provides a communications device. A problem resolving principle of the communications device is similar to the processing method in the embodiments of this disclosure; therefore, implementation of the communications device may be referred to implementation of the method, and details are not described herein again.

Figure 3:
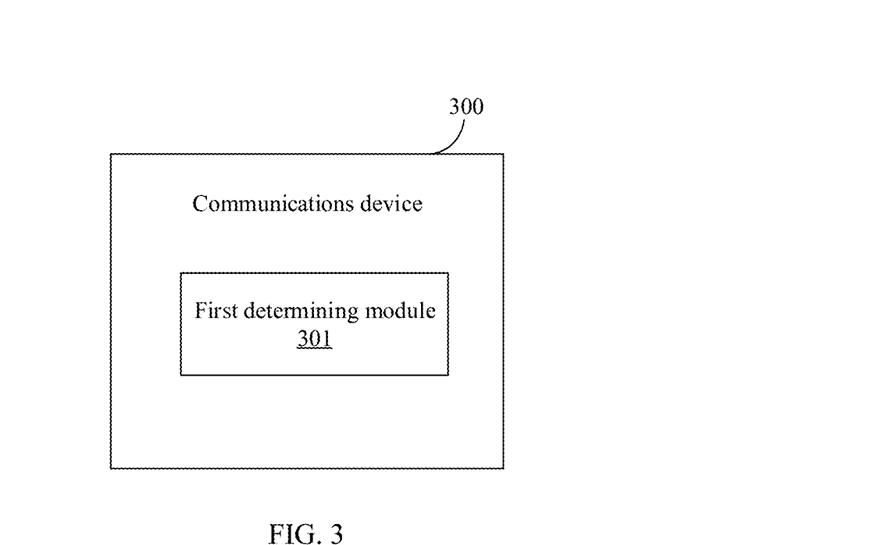
FIG. 3 is a first structural diagram of a communications device according to an embodiment of this disclosure.

Referring to FIG. 3, an embodiment of this disclosure also provides a communications device, such as a terminal or a network device, and the communications device 300 includes:

a first determining module 301, configured to: determine a compression or decompression ROHC entity based on first information.

The first information is one or more of the following: indication information in a header of a PDCP packet; information of mobility procedure completion; a PDCP identifier of a PDCP packet; a connection corresponding to a PDCP packet; indication information in a PDCP control packet; PDCP configuration information; and configuration information for compression or decompression ROHC entities.

In this embodiment of this disclosure, optionally, the PDCP configuration information indicates that the communications device uses a ROHC continuity function, and a PDCP entity of the communications device includes one compression or decompression ROHC entity; or
the PDCP configuration information does not indicate that the communications device uses a ROHC continuity function, and a PDCP entity of the communications device includes a plurality of compression or decompression ROHC entities.

In this embodiment of this disclosure, optionally, the indication information in the PDCP control packet indicates at least one of the following
that the communications device changes a compression or decompression ROHC entity;
that the communications device does not change a compression or decompression ROHC entity; or
that the communications device deletes a previous compression or decompression ROHC entity and establishes a new compression or decompression ROHC entity.

In this embodiment of this disclosure, optionally, the communications device 300 further includes a second determining module, configured to determine the corresponding first information based on a specified indication manner.

The specific indication manner includes one or more of the following:
indicating by a header of a PDCP packet;
indicating by configuration information of a PDCP identifier of the PDCP packet;
indicating by configuration information of a connection corresponding to the PDCP packet; and
indicating by a PDCP control packet.

In this embodiment of the present invention, optionally, the specific indication manner is configured by a network side or prescribed by a protocol.

In this embodiment of this disclosure, optionally, the configuration information of a PDCP identifier includes one or more of the following:
a specified PDCP packet identifier;
a compression or decompression ROHC entity used for a PDCP packet whose identifier is before the specified PDCP packet identifier; or
a compression or decompression ROHC entity used for a PDCP packet whose identifier is after the specified PDCP packet identifier.

In this embodiment of this disclosure, optionally, the first determining module 301 is further configured to perform any one of the following:
if the PDCP identifier of the PDCP packet is before a specified PDCP identifier, using a corresponding compression or decompression ROHC entity; and
if the PDCP identifier of the PDCP packet is after the specified PDCP identifier, using a corresponding compression or decompression ROHC entity.

In this embodiment of this disclosure, optionally, the first determining module 301 is further configured to perform any one of the following:
if the PDCP identifier of the PDCP packet is before a specified PDCP identifier, using a first compression or decompression ROHC entity; and
if the PDCP identifier of the PDCP packet is after the specified PDCP identifier, deleting the first compression or decompression ROHC entity, and establishing and using a new compression or decompression ROHC entity.

The first compression or decompression ROHC entity is a specific compression or decompression ROHC entity that is established by the communications device based on configuration information of a plurality of compression or decompression ROHC entities.

In this embodiment of this disclosure, optionally, the configuration information of a connection corresponding to the PDCP packet includes one or more of the following:
a correspondence between specified connections and specified compression ROHC entities; and
a correspondence between specified connections and specified decompression ROHC entities.

In this embodiment of this disclosure, optionally, the first determining module 301 is further configured to:
if the connection corresponding to the PDCP packet is a first connection, using a compression or decompression ROHC entity corresponding to the first connection.

In this embodiment of this disclosure, optionally, the first determining module 301 is further configured to perform one or more of the following:
establishing a plurality of compression or decompression ROHC entities based on configuration information of a plurality of compression or decompression ROHC entities; and
establishing one specific compression or decompression ROHC entities based on configuration information of one compression or decompression ROHC entity.

In this embodiment of this disclosure, optionally, the first determining module 301 is further configured to: after a mobility procedure is completed, determine, based on the information of mobility procedure completion, a compression or decompression ROHC entity corresponding to a target connection.

In this embodiment of this disclosure, optionally, the communications device 300 further includes a first processing module, and the first processing module is configured to perform one or more of the following:
resetting a compression or decompression ROHC entity corresponding to a source connection; and
deleting the compression or decompression ROHC entity corresponding to the source connection.

In this embodiment of this disclosure, optionally, a trigger event for the mobility procedure completion includes one or more of the following:
a terminal receives indication information of mobility procedure completion transmitted by a network side;
the terminal transmits indication information of mobility procedure completion to the network side;
a random access procedure on the target connection is completed; and
the terminal receives indication information of data processing completion for a source connection.

In this embodiment of this disclosure, optionally, the communications device 300 further includes a second processing module, and the second processing module is configured to perform any one of the following:
determining, based on the PDCP identifier of the PDCP packet, a connection for transmitting the PDCP packet; and
determining, based on a compression ROHC entity that compresses the PDCP packet, a connection for transmitting the PDCP packet.

In this embodiment of this disclosure, optionally, the communications device 300 further includes a third processing module, and the third processing module is configured to perform any one of the following:

during transmission of ROHC entity change information, compressing or decompressing the header of the PDCP packet by using a changed-to compression or decompression ROHC entity;

before transmission of ROHC entity change information, compressing or decompressing the header of the PDCP packet by using the changed-to compression or decompression ROHC entity; and  after transmission of ROHC entity change information, compressing or decompressing the header of the PDCP packet by using the changed-to compression or decompression ROHC entity.

In this embodiment of this disclosure, optionally, the communications device 300 further includes a fourth processing module, and the fourth processing module is configured to perform any one of the following:

during changing of a compression or decompression ROHC entity in use, if the PDCP configuration information indicates that the communications device uses the ROHC continuity function, skipping resetting a previously used compression or decompression ROHC entity;

before changing of the compression or decompression ROHC entity in use, if the PDCP configuration information indicates that the communications device uses the ROHC continuity function, skipping resetting the previously used compression or decompression ROHC entity; and  after changing of the compression or decompression ROHC entity in use, if the PDCP configuration information indicates that the communications device uses the ROHC continuity function, skipping resetting the previously used compression or decompression ROHC entity.

In this embodiment of this disclosure, optionally, the communications device 300 further includes a fifth processing module, and the fifth processing module is configured to perform any one of the following:

during changing of a compression or decompression ROHC entity in use, if the PDCP configuration information does not indicate that the communications device uses the ROHC continuity function, resetting a previously used compression or decompression ROHC entity;

before changing of the compression or decompression ROHC entity in use, if the PDCP configuration information does not indicate that the communications device uses the ROHC continuity function, resetting the previously used compression or decompression ROHC entity; and  after changing of the compression or decompression ROHC entity in use, if the PDCP configuration information does not indicate that the communications device uses the ROHC continuity function, resetting the previously used compression or decompression ROHC entity.

In this embodiment of this disclosure, optionally, the communications device 300 further includes a sixth processing module, and the sixth processing module is configured to perform any one of the following:

during changing of a compression or decompression ROHC entity in use, resetting a previously used compression or decompression ROHC entity;

before changing of the compression or decompression ROHC entity in use, resetting the previously used compression or decompression ROHC entity; and  after changing of the compression or decompression ROHC entity in use, resetting the previously used compression or decompression ROHC entity.

In this embodiment of this disclosure, optionally, the communications device 300 further includes a seventh processing module, and the seventh processing module is configured to perform any one of the following:

during changing of a compression or decompression ROHC entity in use, deleting a previously used compression or decompression ROHC entity;

before changing of the compression or decompression ROHC entity in use, deleting the previously used compression or decompression ROHC entity; and  after changing of the compression or decompression ROHC entity in use, deleting the previously used compression or decompression ROHC entity.

The communications device provided in this embodiment of this disclosure may execute the foregoing method embodiments, and implementation principles and technical effects thereof are similar. Therefore, details are not described herein again.

Figure 4:
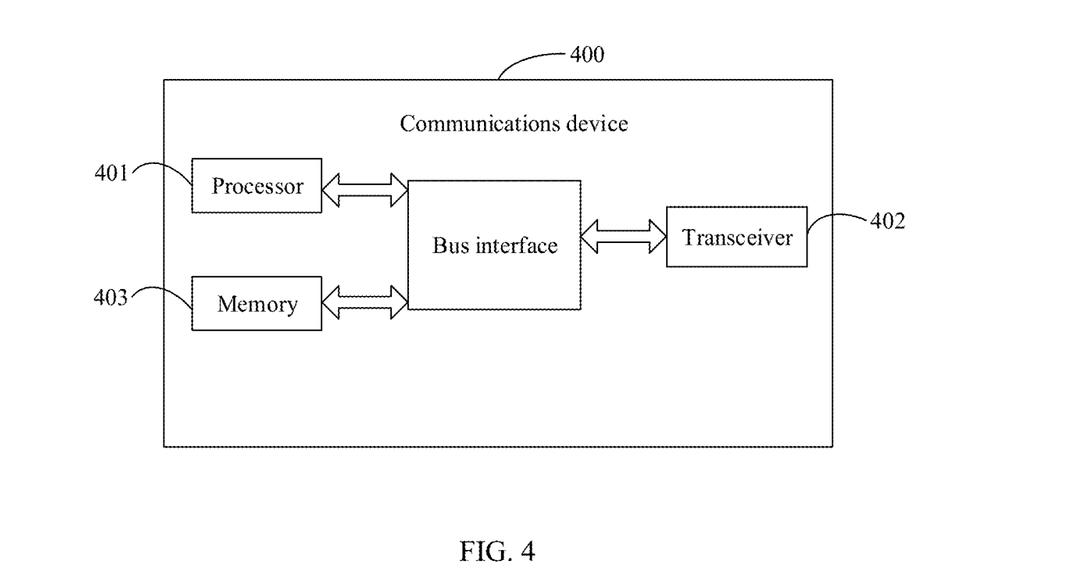
FIG. 4 is a second structural diagram of a communications device according to an embodiment of this disclosure.

Referring to FIG. 4, FIG. 4 is a structural diagram of a communications device to which an embodiment of this disclosure is applied. As shown in FIG. 4, the communications device 400 includes a processor 401, a transceiver 402, a memory 403, and a bus interface.

In this embodiment of this disclosure, the communications device 400 further includes a program stored in the memory 403 and capable of running on the processor 401. When the program is executed by the processor 401, the following steps are implemented: determining a compression or decompression ROHC entity based on first information; where the first information is one or more of the following: indication information in a header of a PDCP packet; information of mobility procedure completion; a PDCP identifier of a PDCP packet; a connection corresponding to a PDCP packet; indication information in a PDCP control packet; PDCP configuration information; and configuration information for compression or decompression ROHC entities.

In FIG. 4, a bus architecture may include any quantity of interconnected buses and bridges, specifically for interconnecting various circuits of one or more processors represented by the processor 401 and a memory represented by the memory 403. The bus architecture may further interconnect various other circuits such as a peripheral device, a voltage regulator, and a power management circuit. These are all well known in the art, and therefore are not further described in this specification. The bus interface provides an interface. The transceiver 402 may be a plurality of components, that is, the transceiver 1402 includes a transmitter and a receiver, and provides a unit for communicating with various other apparatuses on a transmission medium.

The processor 401 is responsible for management of the bus architecture and general processing, and the memory 403 is capable of storing data that is used by the processor 401 during operation.

The communications device provided in this embodiment of this disclosure may execute the foregoing method embodiments, and implementation principles and technical effects thereof are similar. Therefore, details are not described herein again.

The steps of the method or algorithm described with reference with content disclosed in this disclosure may be implemented in a hardware manner, or may be implemented in a manner in which a processor executes software instructions. The software instruction may include a corresponding software module. The software module may be stored in a Random Access Memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory, or a storage medium in any other forms well-known in the art. For example, a storage medium is coupled to a processor, so that the processor can read information from the storage medium or write information into the storage medium. Certainly, the storage medium may alternatively be a component of the processor. The processor and the storage medium may be carried in the ASIC. In addition, the ASIC may be carried in a core network interface device. Certainly, the processor and the storage medium may alternatively exist in the core network interface device as discrete components.

A person of skill in the art should be able to realize that in one or more of the foregoing examples, the functions described in this disclosure may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art, may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The objectives, technical solutions, and benefits of this disclosure are further described in detail in the foregoing specific embodiments. It should be understood that the foregoing descriptions are only specific embodiments of this disclosure, but are not intended to limit the protection scope of this disclosure. Any modification, equivalent replacement, or improvement made within the spirit and principle of this disclosure shall fall within the protection scope of this disclosure.

A person skilled in the art should understand that the embodiments of this disclosure may be provided as a method, a system, or a computer program product. Therefore, the embodiments of this disclosure may use a form of hardware only embodiments, software only embodiments, or embodiments with a combination of software and hardware. Moreover, the embodiments of this disclosure may use a form of a computer program product that is implemented on one or more computer-usable storage media (including but not limited to a disk memory, a compact disc read-only memory (CD-ROM), an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this disclosure without departing from the spirit and scope of this disclosure. This disclosure is intended to cover these modifications and variations provided that the modifications and variations in the embodiments of this disclosure fall within the protection scope defined by the following claims and their equivalent technologies.

What is claimed is:

1. A processing method, performed by a communications device and comprising:
    determining a compression or decompression robust header compression (ROHC) entity based on first information; wherein
    the first information comprises a connection corresponding to a packet data convergence protocol (PDCP) packet;
    wherein the determining the compression or decompression ROHC entity based on the first information comprises:
    in response to the connection corresponding to the PDCP packet being a first connection, using a compression or decompression ROHC entity corresponding to the first connection, wherein the first connection is a source connection or a target connection;
    wherein the first information comprises PDCP configuration information,
    the PDCP configuration information indicates that the communications device uses a ROHC continuity function, and a PDCP entity of the communications device comprises one compression or decompression ROHC entity; or
    the PDCP configuration information does not indicate that the communications device uses a ROHC continuity function, and a PDCP entity of the communications device comprises a plurality of compression or decompression ROHC entities.

2. The method according to claim 1, wherein before the step of determining a compression or decompression ROHC entity based on first information, the method further comprises:
    determining the corresponding first information based on a specific indication manner; wherein
    the specific indication manner comprises indicating by configuration information of a connection corresponding to the PDCP packet.

3. The method according to claim 2, wherein the specific indication manner is configured by a network side or prescribed by a protocol.

4. The method according to claim 1, wherein a PDCP entity of the communications device comprises a plurality of compression or decompression ROHC entities, and the determining a compression or decompression ROHC entity based on first information comprises any one of the following:
    if a PDCP identifier of the PDCP packet is before a specified PDCP identifier, using a corresponding compression or decompression ROHC entity; and
    if the PDCP identifier of the PDCP packet is after the specified PDCP identifier, using a corresponding compression or decompression ROHC entity;
    or,
    wherein a PDCP entity of the communications device comprises one compression or decompression ROHC entity, and the determining a compression or decompression ROHC entity based on first information comprises any one of the following:
    if the PDCP identifier of the PDCP packet is before a specified PDCP identifier, using a first compression or decompression ROHC entity; and
    if the PDCP identifier of the PDCP packet is after the specified PDCP identifier, deleting the first compression or decompression ROHC entity, and establishing and using a new compression or decompression ROHC entity; wherein
    the first compression or decompression ROHC entity is a specific compression or decompression ROHC entity that is established by the communications device based on configuration information of a plurality of compression or decompression ROHC entities.

5. The method according to claim 2, wherein the configuration information of a connection corresponding to the PDCP packet comprises one or more of the following:
    a correspondence between specified connections and specified compression ROHC entities; and
    a correspondence between specified connections and specified decompression ROHC entities.

6. The method according to claim 1,
wherein the determining a compression or decompression ROHC entity based on first information comprises one or more of the following:
establishing a plurality of compression or decompression ROHC entities based on configuration information of a plurality of compression or decompression ROHC entities; and
establishing one compression or decompression ROHC entity based on configuration information of one compression or decompression ROHC entity.

7. The method according to claim 1, wherein the determining a compression or decompression ROHC entity based on first information comprises:
after a mobility procedure is completed, determining, based on information of mobility procedure completion, a compression or decompression ROHC entity corresponding to the target connection.

8. The method according to claim 7, wherein after the determining a compression or decompression ROHC entity corresponding to a target connection, the method further comprises one or more of the following:
resetting a compression or decompression ROHC entity corresponding to the source connection; and
deleting the compression or decompression ROHC entity corresponding to the source connection.

9. The method according to claim 7, wherein a trigger event for the mobility procedure completion comprises one or more of the following:
a terminal receives indication information of mobility procedure completion transmitted by a network side;
the terminal transmits indication information of mobility procedure completion to the network side;
a random access procedure on the target connection is completed; and
the terminal receives indication information of data processing completion for a source connection.

10. The method according to claim 1, wherein after the determining a compression or decompression ROHC entity based on first information, the method further comprises any one of the following:
determining, based on a PDCP identifier of the PDCP packet, a connection for transmitting the PDCP packet; and
determining, based on a compression ROHC entity that compresses the PDCP packet, a connection for transmitting the PDCP packet.

11. The method according to claim 1, wherein after the determining a compression or decompression ROHC entity based on first information, the method further comprises any one of the following:
during transmission of ROHC entity change information, compressing or decompressing the header of the PDCP packet by using a changed-to compression or decompression ROHC entity;
before transmission of ROHC entity change information, compressing or decompressing the header of the PDCP packet by using the changed-to compression or decompression ROHC entity; and
after transmission of ROHC entity change information, compressing or decompressing the header of the PDCP packet by using the changed-to compression or decompression ROHC entity.

12. The method according to claim 1, wherein after the determining a compression or decompression ROHC entity based on first information, the method further comprises any one of the following:
during changing of a compression or decompression ROHC entity in use, if the PDCP configuration information indicates that the communications device uses the ROHC continuity function, skipping resetting a previously used compression or decompression ROHC entity;
before changing of the compression or decompression ROHC entity in use, if the PDCP configuration information indicates that the communications device uses the ROHC continuity function, skipping resetting the previously used compression or decompression ROHC entity; and
after changing of the compression or decompression ROHC entity in use, if the PDCP configuration information indicates that the communications device uses the ROHC continuity function, skipping resetting the previously used compression or decompression ROHC entity.

13. The method according to claim 1, wherein after the determining a compression or decompression ROHC entity based on first information, the method further comprises any one of the following:
during changing of a compression or decompression ROHC entity in use, if the PDCP configuration information does not indicate that the communications device uses the ROHC continuity function, resetting a previously used compression or decompression ROHC entity;
before changing of the compression or decompression ROHC entity in use, if the PDCP configuration information does not indicate that the communications device uses the ROHC continuity function, resetting the previously used compression or decompression ROHC entity; and
after changing of the compression or decompression ROHC entity in use, if the PDCP configuration information does not indicate that the communications device uses the ROHC continuity function, resetting the previously used compression or decompression ROHC entity.

14. The method according to claim 1, wherein after the determining a compression or decompression ROHC entity based on first information, the method further comprises any one of the following:
during changing of a compression or decompression ROHC entity in use, resetting a previously used compression or decompression ROHC entity;
before changing of the compression or decompression ROHC entity in use, resetting the previously used compression or decompression ROHC entity; and
after changing of the compression or decompression ROHC entity in use, resetting the previously used compression or decompression ROHC entity.

15. The method according to claim 1, wherein after the determining a compression or decompression ROHC entity based on first information, the method further comprises any one of the following:
during changing of a compression or decompression ROHC entity in use, deleting a previously used compression or decompression ROHC entity;
before changing of the compression or decompression ROHC entity in use, deleting the previously used compression or decompression ROHC entity; and
after changing of the compression or decompression ROHC entity in use, deleting the previously used compression or decompression ROHC entity.

16. A communications device, comprising a processor, a memory, and a program stored in the memory and capable of running on the processor, wherein when the program is executed by the processor, a processing method is implemented, and the method comprises:
- determining a compression or decompression robust header compression (ROHC) entity based on first information; wherein
- the first information comprises a connection corresponding to a PDCP packet;
- wherein the determining the compression or decompression ROHC entity based on the first information comprises:
- in response to the connection corresponding to the PDCP packet being a first connection, using a compression or decompression ROHC entity corresponding to the first connection, wherein the first connection is a source connection or a target connection;
- wherein the first information comprises PDCP configuration information,
- the PDCP configuration information indicates that the communications device uses a ROHC continuity function, and a PDCP entity of the communications device comprises one compression or decompression ROHC entity; or
- the PDCP configuration information does not indicate that the communications device uses a ROHC continuity function, and a PDCP entity of the communications device comprises a plurality of compression or decompression ROHC entities.

17. A non-transitory computer-readable storage medium, wherein the non-transitory computer-readable storage medium stores a computer program, and when the computer program is executed by a processor, a processing method is implemented, and the method comprises:
- determining a compression or decompression robust header compression (ROHC) entity based on first information; wherein
- the first information comprises a connection corresponding to a PDCP packet;
- wherein the determining the compression or decompression ROHC entity based on the first information comprises:
- in response to the connection corresponding to the PDCP packet being a first connection, using a compression or decompression ROHC entity corresponding to the first connection, wherein the first connection is a source connection or a target connection;
- wherein the first information comprises PDCP configuration information,
- the PDCP configuration information indicates that the communications device uses a ROHC continuity function, and a PDCP entity of the communications device comprises one compression or decompression ROHC entity; or
- the PDCP configuration information does not indicate that the communications device uses a ROHC continuity function, and a PDCP entity of the communications device comprises a plurality of compression or decompression ROHC entities.

18. The method according to claim 1, wherein for the same PDCP entity, the source connection and the target connection each is configured with a corresponding compression ROHC entity or a corresponding decompression ROHC entity.

* * * * *